United States Patent
Kim

[19]

[11] Patent Number: 6,091,282
[45] Date of Patent: Jul. 18, 2000

[54] HIGH VOLTAGE GENERATING CIRCUIT FOR A SEMICONDUCTOR MEMORY CIRCUIT

[75] Inventor: Yong Hwan Kim, Chungcheongbuk-do, Rep. of Korea

[73] Assignee: LG Semicon Co., Ltd., Chungcheongbuk-Do, Rep. of Korea

[21] Appl. No.: 09/150,614

[22] Filed: Sep. 10, 1998

[30] Foreign Application Priority Data

May 4, 1998 [KR] Rep. of Korea ........................ 98-15950

[51] Int. Cl.[7] ....................................................... G05F 1/10
[52] U.S. Cl. .......................................... 327/536; 327/540
[58] Field of Search ..................................... 327/143, 536, 327/530, 538, 540, 541, 543; 363/60

[56] References Cited

U.S. PATENT DOCUMENTS 5,138,190  8/1992  Yamazaki et al. ....................... 307/296
5,276,646  1/1994  Kim et al. ............................ 365/189.09
5,796,293  8/1998  Yoon et al. ............................... 327/540
6,018,264  1/2000  Jim ......................................... 327/536

*Primary Examiner*—Jung Ho Kim
*Attorney, Agent, or Firm*—Morgan, Lewis & Bockius LLP

[57] ABSTRACT

A high voltage generating circuit is disclosed, which reduces power consumption due to unnecessary operations. The high voltage generating circuit includes a charge pump for pumping an output voltage in response to a first pump control signal and a second pump control signal which are synchronizing signals, a first level detector operated by an externally applied enable signal and for detecting a first level from the output voltage and outputting a first level signal, a first pump controller for generating a control signal using the first level signal and a reference signal, and outputting the first pump control signal using the control signal and an externally applied inverted clock signal, a second level detector operated by the control signal and for detecting a second level from the output voltage and outputting a second level signal, and a second pump controller for outputting the second pump control signal using the second level signal, the reference signal and an externally applied clock signal.

15 Claims, 3 Drawing Sheets

HIGH VOLTAGE GENERATING CIRCUIT FOR A SEMICONDUCTOR MEMORY CIRCUIT

BACKGROUND OF THE INVENTION

1. Field of the Invention

The present invention relates to a high voltage generating circuit for a semiconductor memory circuit, and more particularly, to a high voltage generating circuit which reduces power consumption due to unnecessary operations.

2. Discussion of the Related Art

Generally, in programing and erasing a flash cell in a flash memory, a charge pump circuit for generating a high voltage is required.

A conventional high voltage generating circuit will be described with reference to the accompanying drawing.

FIG. 1 is a circuit diagram illustrating a conventional high voltage generating circuit.

As shown in FIG. 1, the conventional high voltage generating circuit includes a plurality of charge pumps 100, an output voltage sensor 200, a reference voltage generator 300, a voltage comparator 400, and a clock controller 500.

In the charge pumps 100, there is provided a voltage supplied from a power source voltage terminal Vcc through an NMOS transistor 11. The power source voltage Vcc is in common applied to a gate and a drain of the NMOS transistor 11. A source of the NMOS transistor 11 serves as an output terminal.

Each of the charge pumps 100 includes first and second capacitors 13 and 15 having first and second pump control signals 17 and 18 of different phases as input signals, respectively, and first and second NMOS transistors 14 and 16 connected in series, of which gates are respectively connected to the first and second capacitors 13 and 15, drains and gates are in common connected to the source of the NMOS transistor 11, and the drains serve as respective output terminals.

In the aforementioned charge pump 100, the voltage supplied from the power source voltage terminal Vcc through the NMOS transistor 11 is precharged at Vcc-Vt in the drain of the first NMOS transistor 14. At this time, an input value of the first capacitor 13 is "0".

In view of the fact that there exists voltage difference between both ends of the first capacitor 13, when the first pump control signal 17 has the power source voltage Vcc, the drain of the first NMOS transistor 14 ascends by 2Vcc-Vt and the drain of the second NMOS transistor 16 is precharged at 2(Vcc-Vt).

At this time, the second pump control signal 18 of the second capacitor 15 becomes 0V and the voltage difference between both ends of the second capacitor 15 becomes 2(Vcc-Vt).

Meanwhile, the charge pumps 100 are connected in series to gradually ascend an output voltage 19 by means of the first and second pump control signals 17 and 18.

The output voltage sensor 200 includes first and second resistors 201 and 202 connected in series between the output voltage terminal 19 and a ground voltage terminal Vss, a dynamic resistor circuit 250 connected with the first resistor 201 in parallel, having two dynamic resistors 205 and 206, and first and second EEPROM fuse circuits 210 and 220.

The dynamic resistor circuit 250 includes first and second transistors 205 and 206 and first and second resistors 203 and 204 connected in series between the output voltage terminal 19 and an output node 207 which is interposed between the first and second resistors 201 and 202.

The gates of the first and second transistors 205 and 206 are respectively connected to output terminals 230 and 240 of the first and second EEPROM fuse circuits 210 and 220.

The first and second EEPROM fuse circuits 210 and 220 respectively include first and second depletion transistors 211 and 221 with the drain connected to the ground voltage and the gate connected to the source, floating gate field effect transistors 212 and 222 with the channels connected between the source of the depletion transistors 211 and 221 and the ground voltage and the control gates connected to reset signals 252 and 254, and first and second inverters 213 and 223 for inverting the outputs of the output nodes interposed between the source of the depletion transistors 211 and 221 and the drains of the floating gate field effect transistors 212 and 22 to provide the gates of the transistors 205 and 206 of the dynamic resistor circuit 250.

The floating gate field effect transistors 212 and 222 serve as an EEPROM fuse cell that is erased or programmed according to cell state control signals 251 and 253 applied to the drain thereof.

The reference voltage generator 300 includes first and second depletion transistors 302 and 305 connected in series between the source voltage terminal and the ground voltage terminal, first and second NMOS transistors 303 and 304 connected in series between the first and second depletion transistors 302 and 305, and an inverter 301 for inverting a write enable signal $\overline{WE}$ to in common provide the gates of the first and second NMOS transistors 303 and 304 with the inverted signal.

The reference voltage is output through an output node 310 from a contact point between the first and second NMOS transistors 303 and 304.

The voltage comparator 400, which serves as a typical differential amplifier, includes two PMOS transistors 403 and 404 and three NMOS transistors 401, 402 and 405. The gate of the NMOS transistor 405 connected to an inverter 406 which inverts the write enable signal $\overline{WE}$. The output of the voltage comparator 400 passes through three inverters 407, 408 and 409.

The voltage comparator 400 compares the reference voltage output through the node 310 with a voltage output through a node 260 and varies input values of the inverter 407.

The clock controller 500 includes first and second NOR gates 501 and 502, a first inverter 503, and second and third inverters 504 and 505. A clock pulse signal OP, a write enable signal $\overline{WE}$, and the output signals of the voltage comparator 400 are respectively input to the first and second NOR gates 501 and 502. The first inverter 503 inverts an output signal of the first NOR gate 501 and outputs a first pump control signal 17. The second and third inverters 504 and 505 delay an output signal of the second NOR gate 502 and output a second pump control signal 18.

The clock controller 500 is enabled when the write enable signal $\overline{WE}$ is low. The clock controller 500 generates the first and second pump control signals 17 and 18 of different phases through the inverters 503, 504 and 505 when the node 410 is low by the clock pulse signal OP.

In the conventional high voltage generating circuit, the output voltage 19 ascends by means of the voltage pumps 100 and the size of a desired output voltage is determined by the output voltage sensor 200.

If the output voltage 19 is lower than a given voltage, the voltage of the node 310 becomes higher than the voltage of the node 260, so that the input of the inverter 407 becomes high and the voltage of the node 410 becomes low. As a result, since the outputs of the NOR gates 501 and 502 are determined by the clock pulse signal OP regardless of the node 410, the input signals of the charge pumps 100, i.e., the first and second pump control signals 17 and 18 have different phases to allow the charge pumps 100 to perform normal operation.

While, if the output voltage 19 is higher than a given voltage, the voltage of the node 310 becomes lower than the voltage of the node 260, so that the input of the inverter 407 becomes low and the voltage of the node 410 becomes high. As a result, since the outputs of the NOR gates 501 and 502 become low regardless of the clock pulse signal OP, the input signals of the charge pumps 100, i.e., the first and second pump control signals 17 and 18 become high and low, respectively, so as not to operate the charge pumps 100.

The aforementioned conventional high voltage generating circuit has several problems.

Since the charge pumps are not operated if the output voltage is lower than the given voltage, current is supplied from the output voltage during programming, thereby rapidly lowering the output voltage. In other words, increasing voltage ripple in the course of reducing the output voltage causes poor program performance.

SUMMARY OF THE INVENTION

Accordingly, the present invention is directed to a high voltage generating circuit that substantially obviates one or more of the problems due to limitations and disadvantages of the related art.

An object of the present invention is to provide a high voltage generating circuit which reduces an output voltage of a charge pump to limit the operation of a pump circuit, thereby reducing power consumption due to unnecessary operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a high voltage generating circuit according to the present invention includes a charge pump for pumping an output voltage in response to a first pump control signal and a second pump control signal which are synchronizing signals, a first level detector operated by an externally applied enable signal and for detecting a first level from the output voltage and outputting a first level signal, a first pump controller for generating a control signal using the first level signal and a reference signal, and outputting the first pump control signal using the control signal and an externally applied inverted clock signal, a second level detector operated by the control signal and for detecting a second level from the output voltage and outputting a second level signal, and a second pump controller for outputting the second pump control signal using the second level signal, the reference signal and an externally applied clock signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
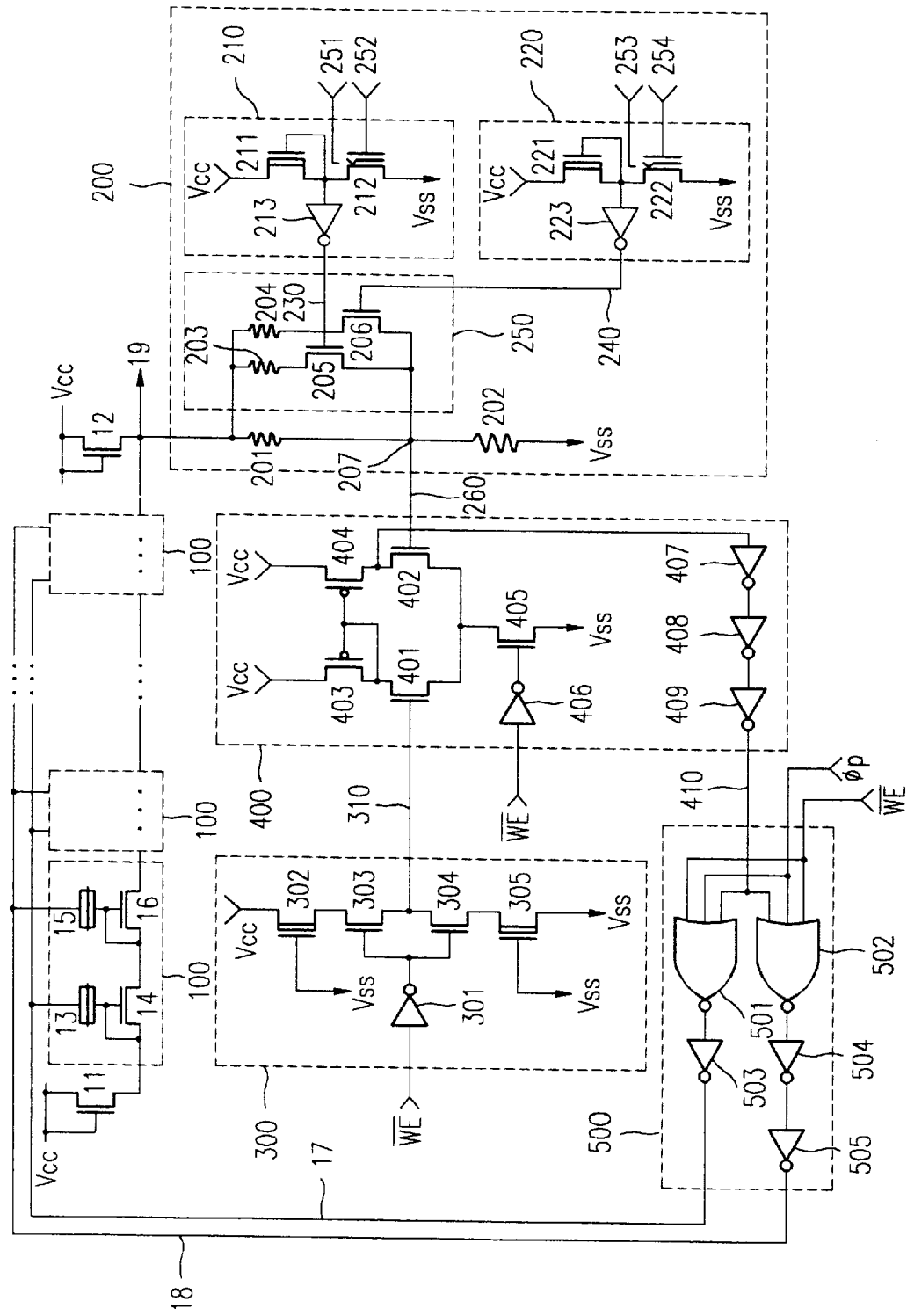
FIG. 1 is a circuit diagram illustrating a conventional high voltage generating circuit.
Figure 2:
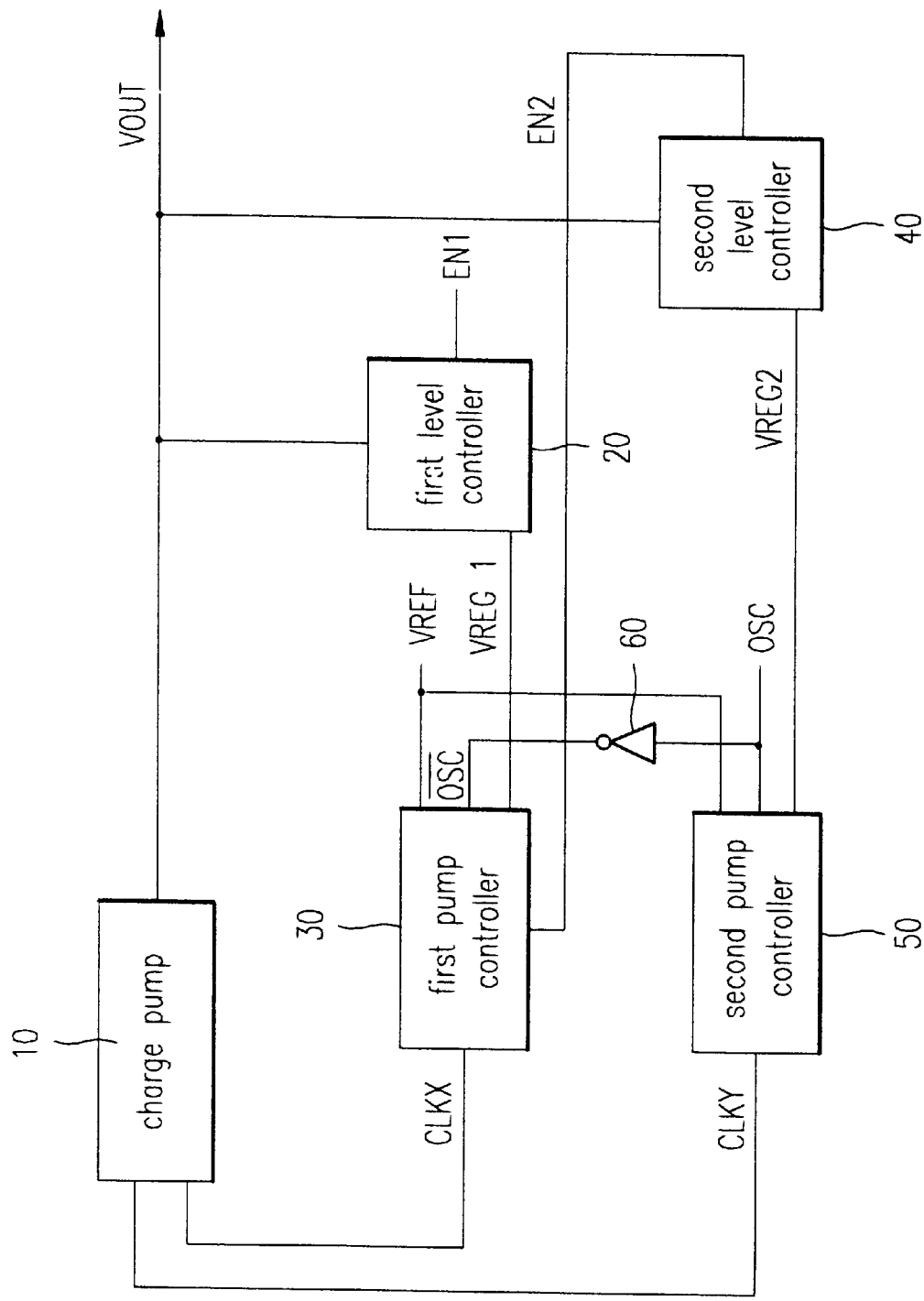
FIG. 2 is a block diagram illustrating a high voltage generating circuit according to the present invention.

As shown in FIG. 2, a high voltage generating circuit according to the present invention includes a charge pump 10 for performing pumping operation using first and second pump control signals CLKX and CLKY, which are controlled by an output voltage VOUT, as synchronizing signals, a first level detector 20 operated by an externally applied signal EN1, for outputting a first output signal VREG1 from the output voltage VOUT by means of resistivity, a first pump controller 30 for outputting the first pump control signal CLKX from the first output signal VREG1 of the first level detector 20, a reference voltage VREF, and an externally applied first clock signal $\overline{OSC}$, a second level detector 40 for outputting a second output signal VREG2 from the output voltage VOUT by means of resistivity using the first pump control signal CLKS of the first pump controller 30 as an enable signal EN2, and a second pump controller 50 for outputting the second pump control signal CLKY from the second output signal VREG2 of the second level detector 40, the reference voltage VREF and a second clock signal OSC having a phase opposite to the first clock signal $\overline{OSC}$.

A reference numeral 60 which is not described above denotes an inverter for inverting the second clock signal OSC and outputting the inverted clock signal $\overline{OSC}$ to the first pump controller 30.

The detailed configuration of the aforementioned high voltage generating circuit will be described with reference to FIG. 3.

Figure 3:
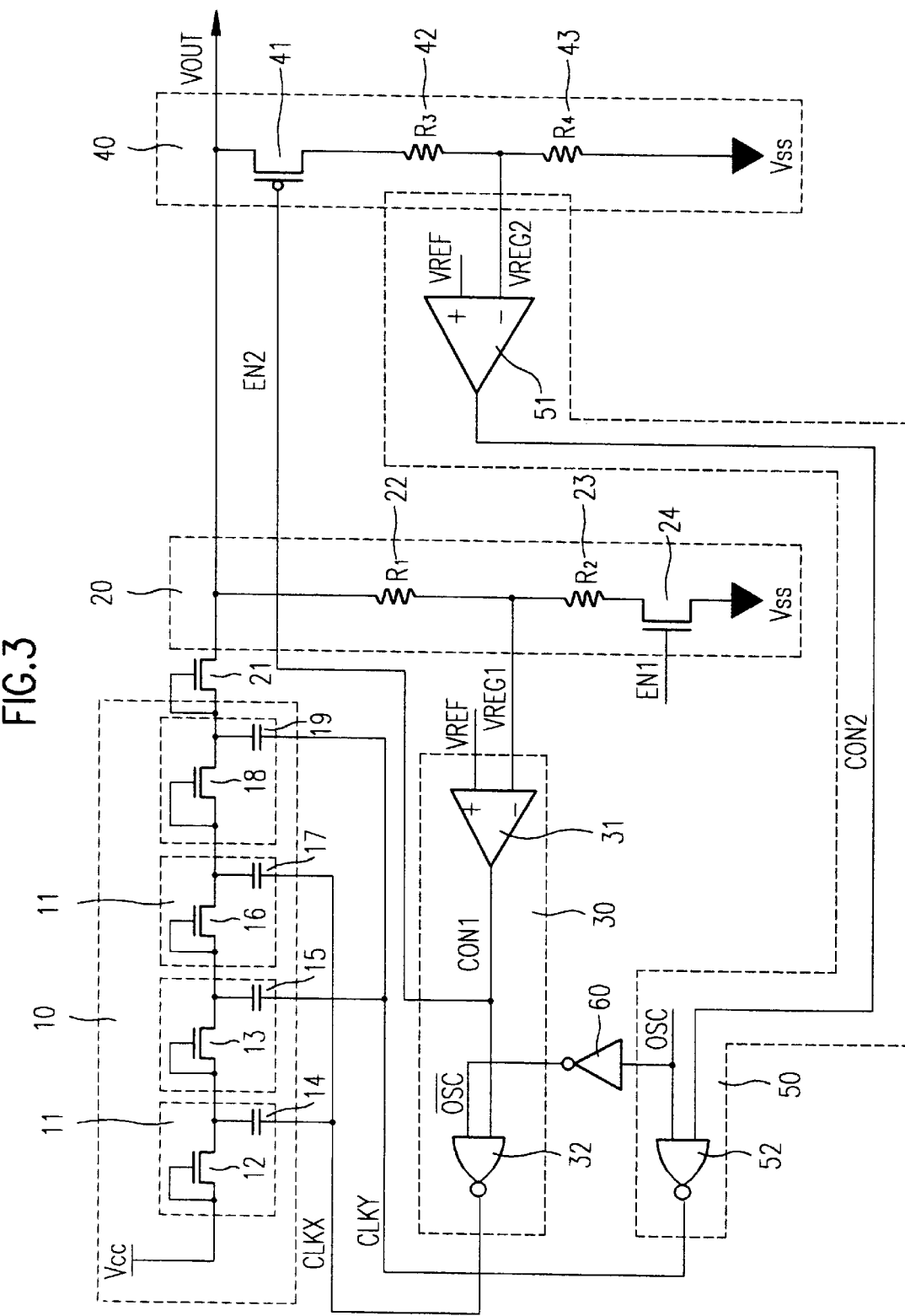
FIG. 3 is a detailed circuit diagram illustrating a high voltage generating circuit according to the present invention.

As shown in FIG. 3, the charge pump 10 includes a plurality of pumping portions 11 connected in series between an input terminal, i.e., a power source voltage terminal Vcc and an output voltage terminal VOUT.

The pumping portions 11 include first, second, third and fourth NMOS transistors 12, 13, 16 and 18 and first, second, third and fourth capacitors 14, 15, 17 and 19.

A drain and a gate of the first NMOS transistor 12 are connected to the power source voltage terminal Vcc and its source is connected to a drain and a gate of the second NMOS transistor 13.

The output of the first capacitor 14 is connected to the source of the first NMOS transistor 12 and to the drain and the gate of the second NMOS transistor 13. The input of the first capacitor 14 is connected to the first pump control signal CLKX.

The output of the second capacitor 15 is connected to the source of the second NMOS transistor 13 and to the drain and the gate of the third NMOS transistor 16. The input of the second capacitor 15 is connected to the second pump control signal CLKY.

The output of the third capacitor 17 is connected to the source of the third NMOS transistor 16 and to the drain and the gate of the fourth NMOS transistor 18. The input of the third capacitor 17 is connected to the first pump control signal CLKX.

The output of the fourth capacitor 19 is connected to the source of the fourth NMOS transistor 18 and to the drain and the gate of a fifth NMOS transistor 21. The input of the fourth capacitor 19 is connected to the second pump control signal CLKY.

The fifth NMOS transistor 21 serves to prevent the output signal of the charge pump 10 from flowing backward. Each of the pumping portions 11 consists of one NMOS transistor and one capacitor. The respective pumping portions 11 are connected in series.

The inputs of the pumping portions 11 are the drains and the gates of the first, second, third and fourth NMOS transistors 12, 13, 16 and 18. The outputs of the pumping portions 11 are the sources of the first, second, third and fourth NMOS transistors 12, 13, 16 and 18. The inputs of the first, second, third and fourth capacitors become the first and second pump control signals CLKX and CLKY, in turn.

The source of the fifth NMOS transistor 21 is connected to the inputs of the first and second level detectors 20 and 40, i.e., an input terminal of a resistor 22 and a drain of a PMOS transistor 40.

The first level detector 20 includes first and second resistors 22 and 23 and a sixth NMOS transistor 24. The first and second resistors 22 and 23 are connected in series between the output voltage VOUT and the ground voltage Vss.

The output VREG1 of the first resistor 22 is connected to the input of the second resistor 23 and the input of a first pump controller 30. The output of the second resistor 23 is connected to the drain of the sixth NMOS transistor 24. A gate of the sixth NMOS transistor 24 is connected to the externally applied signal EN1 and its source is connected to the ground voltage Vss.

The second level detector 40 includes the PMOS transistor 41 of which the drain is connected to the output voltage VOUT of the charge pump 10 and a gate is connected to the output voltage of the second pump controller 50, and third and fourth resistors 42 and 43 connected in series to the source of the PMOS transistor 41 and the ground voltage terminal Vss.

The output of the third resistor 42 is connected to the input of the second pump controller 50 and the input of the fourth resistor 43. The output of the fourth resistor 43 is connected to the ground voltage terminal Vss.

Meanwhile, the output of the third resistor 42 is connected to the input of the fourth resistor 43. The output of the fourth resistor 43 is connected to the ground voltage terminal Vss. The gate of the PMOS transistor 41 is connected to the output of the first differential amplifier 31 and its source is connected to the output voltage VOUT.

The first pump controller 30 includes a first differential amplifier 31 and a first NAND gate 32.

The input of the first differential amplifier 31 is connected to the reference voltage VREF and the other input thereof is connected to a contact point between the first and second resistors 22 and 23. The output of the first differential amplifier 31 is connected to one input of the first NAND gate 32. The other input of the NAND gate 32 is connected to the first clock signal $\overline{OSC}$ and the first pump control signal CLKX is connected to the inputs of the first and third capacitor 14 and 17.

The second pump controller 50 includes a second differential amplifier 51 and a second NAND gate 52.

The one input of the second differential amplifier 51 is connected to the reference voltage VREF and the other input thereof is connected to a contact point between the third and the fourth resistors 42 and 43 of the second level detector 40. The output of the second differential amplifier 51 is connected to one input of the second NAND gate 52. The other input of the NAND gate 52 is connected to the second clock signal OSC. The second pump control signal CLKY is connected to the inputs of the second and fourth capacitors 15 and 19.

Meanwhile, the inverter 60 inverts the second clock signal OSC and outputs the first clock signal $\overline{OSC}$ of the first pump controller 30.

The operation of the high voltage generating circuit according to the present invention will be described below.

As shown in FIG. 3, in the charge pump 10 having the output voltage VOUT and the input terminal Vcc, for pumping the output voltage to a high voltage, the source of the first NMOS transistor 12 is precharged to Vcc-Vt level by means of the input terminal Vcc. At this time, the input signal CLKX of the first capacitor 14 has a value "0".

When the first pump control signal CLKX is high and the second pump control signal CLKY is low, the first pump control signal serves as the input terminal Vcc and the voltage of the first capacitor 14 is maintained without variation. Thus, the output of the second capacitor 15 becomes 2Vcc-Vt. At this time, since the second pump control signal CLKY is "0", the second capacitor 15 is precharged. In other words, the second NMOS transistor 13 is turned on and the output of the second capacitor 15 is precharged to 2(Vcc-Vt) level. The voltage difference between both ends of the second capacitor 15 becomes 2(Vcc-Vt).

As aforementioned, the pumping operation of the charge pump 10 is performed.

Subsequently, in the first level detector 20, the values of the first and second resistors 22 and 23 are determined depending on an output voltage Vout1 given by the charge pump 10. Where, Vout1 is expressed as follows.

$$Vout1 = \left(1 + \frac{R_1}{R_2}\right) \times VREF$$

In other words, if the external signal EN1 becomes high, the first level detector 20 starts to operate. If the output voltage VOUT is lower than the given output voltage Vout1, the output signal VREG1 of the first level detector 20 becomes lower than the reference voltage VREF in response to voltage distribution rule. If the output voltage VOUT is identical to the given output voltage Vout1, the output signal VREG1 of the first level detector 20 becomes identical to the reference voltage VREF. If the output voltage VOUT is higher than the given output voltage Vout1, the output signal VREG1 of the first level detector 20 becomes higher than the reference voltage VREF.

In the second level detector 40, the values of the third and fourth resistors 43 and 43 are determined by a given output voltage Vout2. Where, the given output voltage Vout2 is expressed as follow.

$$Vout1 = \left(1 + \frac{R_3}{R_4}\right) \times VREF$$

In other words, if the external signal EN2 becomes low, the PMOS transistor 41 is enabled and thus the second level detector 40 starts to operate. The output signal VREG2 of the second level detector 40 is higher or lower than the reference voltage VREF depending on whether the output voltage VOUT is higher or lower than the given output voltage Vout2.

In the first pump controller 30, if the output signal VREG1 of the first level detector 20 is higher than the reference voltage VREF, the output signal CON1 of the first differential amplifier 31 becomes low, so that the output signal of the first NAND gate 32, i.e., the first pump control signal CLKX is maintained at high regardless of the output of the inverter 60. If the output signal VREG1 of the first level detector 20 is lower than the reference voltage VREF, the output signal CON1 of the first differential amplifier 31 becomes high, so that the output signal of the first NAND gate 32, i.e., the first pump control signal CLKX is varied depending on the output of the inverter 60.

Meanwhile, the second pump controller 50 is operated in such a manner as the first pump controller 30.

In the overall operation, if the output voltage VOUT is lower than the given output voltage Vout1 during the pumping operation of the charge pump 10, the output signal VREG1 of the first level detector 20 becomes lower than the reference voltage VREF. Thus, the output signal CON1 of the first differential amplifier 31 becomes high and the first pump control signal CLKX is synchronized by the first clock signal $\overline{OSC}$.

At this time, since the output signal CON1 of the first differential amplifier 31 is high, the PMOS transistor 41 is turned off and the output signal VREG2 of the second level detector 40 becomes "0" to be lower than the reference voltage VREF.

As a result, the output signal CON2 of the second differential amplifier 51 becomes high and the second pump control signal CLKY is synchronized by the second clock signal OSC.

Therefore, the first and second pump control signals CLKX and CLKY are synchronized to operate all the first, second, third and fourth capacitors 14, 15, 17 and 19, so that normal pumping operation is performed.

During the subsequent pumping operation, if the output voltage VOUT is higher than the given output voltage Vout1, the output signal CON1 of the first differential amplifier 31 becomes low and the first pump control signal CLKX becomes high regardless of the first clock signal $\overline{OSC}$. As a result, the pumping operation of the first and third capacitors 14 and 17 are not performed.

At this time, the PMOS transistor 41 is turned on. If the output voltage VOUT is lower than the given output voltage Vout2, the output signal CON2 of the second differential amplifier 51 is maintained at high and the second pump control signal CLKY is synchronized by the second clock signal OSC. As a result, the second and fourth capacitors 15 and 19 are normally operated to pump the output voltage VOUT.

If the output voltage VOUT becomes higher than the given output voltage Vout2, the output signal CON2 of the second differential amplifier 51 becomes low to suppress the operations of the first, second, third and fourth capacitors 14, 15, 17 and 19. As a result, the variation of the output voltage VOUT is reduced.

Meanwhile, the number of the first and second level detectors and the number of the first and second pump controllers are identical to the number of the capacitors.

As aforementioned, the high voltage generating circuit of the present invention has the following advantages.

Since the synchronizing signal of the charge pump is disabled gradually, movement of the output voltage is reduced to perform exact regulation operation, thereby improving programming or erasing performance in the flash cell. In addition, since the respective capacitors are separately enabled or disabled, peak current is reduced, thereby reducing noise.

It will be apparent to those skilled in the art that various modifications and variations can be made in the high voltage generating circuit according to the present invention without departing from the spirit or scope of the invention. Thus, it is intended that the present invention covers the modifications and variations of the invention provided they come within the scope of the appended claims and their equivalents.

What is claimed is:

1. A high voltage generating circuit comprising:
   a charge pump for pumping an output voltage in response to a first pump control signal and a second pump control signal which are synchronizing signals;
   a first level detector operated by an externally applied enable signal and for detecting a first level from the output voltage and outputting a first level signal;
   a first pump controller for generating a control signal using the first level signal and a reference signal, and outputting the first pump control signal using the control signal and an externally applied inverted clock signal;
   a second level detector operated by the control signal and for detecting a second level from the output voltage and outputting a second level signal; and
   a second pump controller for outputting the second pump control signal using the second level signal, the reference signal and an externally applied clock signal.

2. The high voltage generating circuit as claimed in claim 1, wherein the charge pump includes a plurality of pumping portions connected in series between a power source voltage terminal and the output voltage terminal.

3. The high voltage generating circuit as claimed in claim 2, wherein each of the pumping portions includes one NMOS transistor and one capacitor.

4. The high voltage generating circuit as claimed in claim 2, wherein inputs of the pumping portions are drains and gates of first, second, third and fourth NMOS transistors, their outputs are sources of the first, second, third and fourth NMOS transistors, and first and second clock signals are in turn connected to input terminals of first, second, third and fourth capacitors.

5. The high voltage generating circuit as claimed in claim 1, wherein the first level detector includes first and second resistors and an NMOS transistor connected in series between the output voltage terminal of the charge pump and a ground voltage terminal.

6. The high voltage generating circuit as claimed in claim 5, wherein an output of the first resistor is connected to an input of the second resistor, an output of the second resistor is connected to a drain of the NMOS transistor, a gate of the NMOS transistor is connected to an external signal, and a source of the NMOS transistor is connected to the ground voltage terminal.

7. The high voltage generating circuit as claimed in claim 1, wherein the second level detector includes a PMOS transistor and third and fourth resistors connected in series between the output voltage terminal of the charge pump and the ground voltage terminal.

8. The high voltage generating circuit as claimed in claim 7, wherein an output of the third resistor is connected to an input of the fourth resistor, an output of the fourth resistor is connected to the ground voltage terminal, a gate of the PMOS transistor is connected to an output of a first differential amplifier, and a source of the PMOS transistor is connected to the output voltage terminal.

9. The high voltage generating circuit as claimed in claim 1, wherein the first pump controller includes a first differential amplifier and a first NAND gate.

10. The high voltage generating circuit as claimed in claim 9, wherein an input of the first differential amplifier is connected to the reference voltage, its other input is connected to a contact point between the first and second resistors, and its output is connected to one input of the first NAND gate.

11. The high voltage generating circuit as claimed in claim 9, wherein the other input of the first NAND gate is connected to an externally applied first clock signal and the first pump control signal is connected to inputs of the first and third capacitors.

12. The high voltage generating circuit as claimed in claim 1, wherein t he second pump controller includes a second differential amplifier and a second NAND gate.

13. The high voltage generating circuit as claimed in claim 12, wherein an input of the second differential amplifier is connected to the reference voltage, its other input is connected to a contact point between the third and fourth resistors, and its output is connected to one input of the second NAND gate.

14. The high voltage generating circuit as claimed in claim 12, wherein the other input of the second NAND gate is connected to an externally applied second clock signal having a phase opposite to the first clock signal and the second pump control signal is connected to inputs of the second and fourth capacitors.

15. The high voltage generating circuit as claimed in claim 1, wherein the number of the first and second level detectors and the number of the first and second pump controller are identical to the number of the pumping portions.

* * * * *